June 6, 1961  L. PÉRAS  2,987,197
AUTOMATIC WORK-HANDLING DEVICE FOR MACHINE TOOLS
Filed June 19, 1957  3 Sheets-Sheet 1

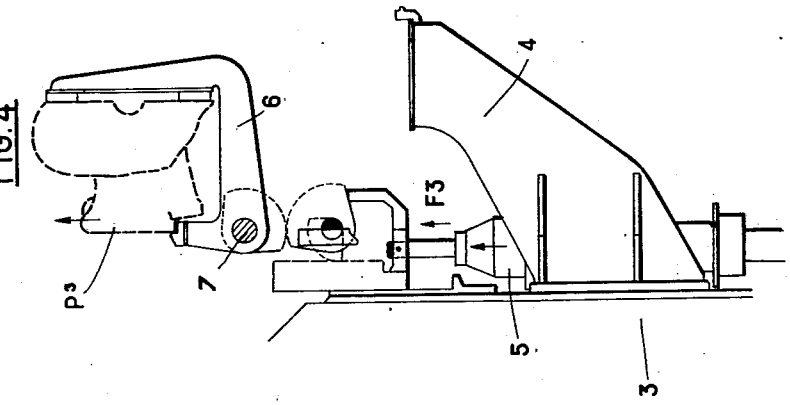
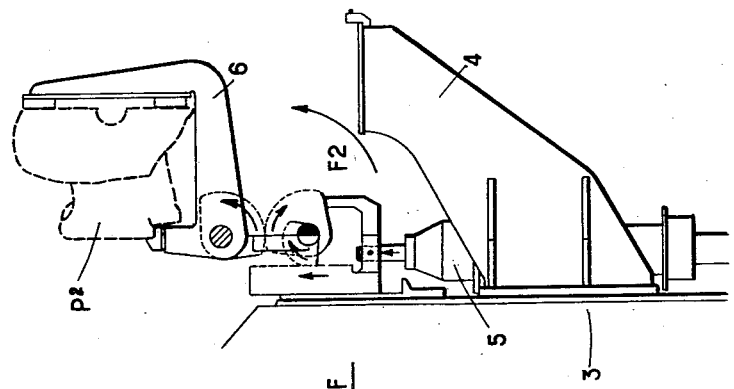
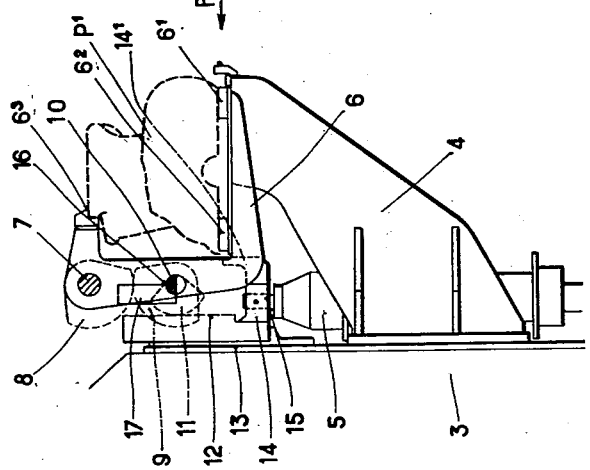

United States Patent Office 2,987,197
Patented June 6, 1961

1

2,987,197
AUTOMATIC WORK-HANDLING DEVICE FOR MACHINE TOOLS
Lucien Perás, Billancourt, France, assignor to Regie Nationale des Usines Renault, Billancourt, France, a French works
Filed June 19, 1957, Ser. No. 666,626
Claims priority, application France June 21, 1956
4 Claims. (Cl. 214—1)

A number of known devices enable work-pieces which are finished or in course of machining to be moved from one point to another. These pieces are for example moved from one machine to the other by being hooked on to conveyors, or again they may be placed on roller-tracks or on conveyor bands. They can also be placed inside mountings which are moved from one work station to another, with a view to the completion in each of these stations of different machining operations, as for example in a transfer machine.

Direct supply devices are also known for a machine in which component parts are introduced for the purposes of assembly.

Up to the present time however, no device of this kind has been applied to the supply of automatic machines in which the piece has to be fixed on a mounting before it is introduced into the transformation lines. Manual operations were then carried out by a worker who fixed the piece on a suitable mounting by means of stirrups or bolts, and who then pushed it on to the conveyor or other member supplying the first working station.

The present invention has precisely for its object the production of a device which is capable, after reception of the work-piece, to direct it first of all into the desired position, and then to introduce it into its mounting in which it will then be fixed by manual or automatic means.

The piece brought in having been previously directed in a suitable manner about one of its vertical axes by a rotating plate or by any other known means, the device in accordance with the invention is composed in practice of two mechanical units which co-operate in succession in placing the said piece in position in its mounting or jig.

The first unit comprises essentially a receiving and directing member pivotally mounted about a horizontal axis, the said member being actuated so as to orientate the piece about one of its own horizontal axes in order to present it in front of the mounting and in such manner that a simple movement of translation is sufficient to carry it into the mounting. In addition, the said receiving member, when it is for example placed lower than the mounting while waiting for the piece, may be provided with a lifting movement for the piece, following its orientation for example, with the object of bringing it up to the same level as the mounting, if it is not desired or not practicable to employ the orientation movement wholly to carry out this movement.

The second unit comprises essentially a conveyor member having the object of gripping the piece previously presented and orientated, and to subject it to the appropriate movement of translation which enables the piece to be placed in its mounting. The said conveyor member, subjected to a horizontal travel initiated for example at the end of the action of the first unit, is in addition provided with a lifting and lowering system actuated in its first function, after gripping the work-piece, in order to free the piece from the supports of the receiving and orientating member, and in its second function, at the end of the travel of the conveyor member, in order to place the said work-piece in the position provided on the supports of the mounting which awaits it.

Certain other special features of the invention will also become more clearly apparent from a form of construction which will now be described, by way of example, within the frame work of a device for supplying a complex machine intended to machine the cylinder-blocks of automobile engines.

In the accompanying drawings:

FIGS. 2, 3 and 4 are three views in elevation of the mechanical receiving and orientating unit corresponding to three successive phases of its operation;

Figure 1:
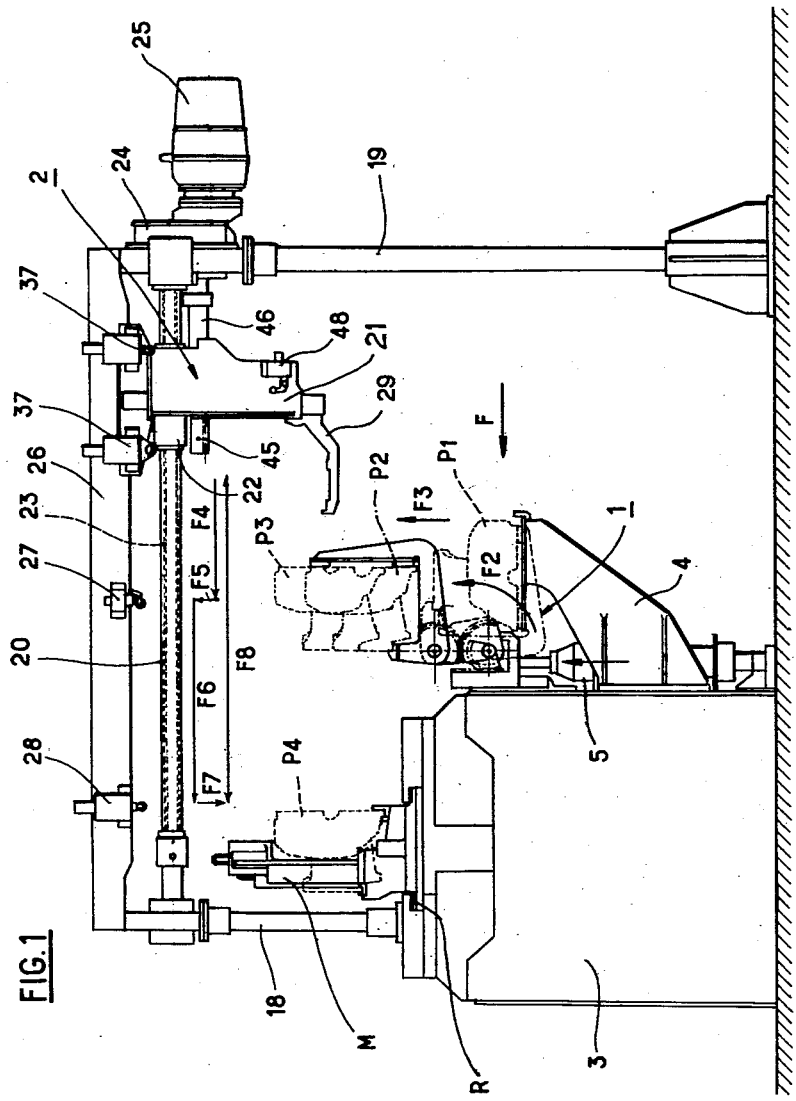
FIG. 1 is a general view in elevation of a device in accordance with the invention.

Referring now to FIG. 1, there can be seen the mechanical receiving and orientating unit 1, intended to receive the piece P, to cause it to pivot, then to raise it to the level of its mounting M, following the successive positions P1, P2, P3. The input of the pieces supplied to the device is effected following the arrow F by a roller conveyor of standard type, or using for example the special rollers which form the subject of the patent application filed in U.S.A. on April 4, 1956, under Serial No. 576,019, by the present applicant with the title "Improvements in Roller Conveyors for Handling Loads."

There can also be seen the mechanical conveyor unit 2, which is intended to seize the work-piece in the position P3, to lift it in order to free it from its support, to cause it to be subjected to a suitable movement of translation, and finally place it by lowering into its mounting M in the position P4.

Finally, there is shown the frame 3 of the machine tool carrying the roller track R, on which the mounting M carrying the piece P can be moved with a view to its introduction into the machine.

The mechanical unit 1 has been shown in the position of rest in FIG. 2. It is essentially composed of a fixed frame 4 in the form of a bracket, fixed to the machine 2 and in the interior of which is placed an operating jack 5 of the pivoted receiving member, constituted by two arms 6 in the form of a right angle which are keyed on the shaft 7 and can thus rotate with this shaft. Each arm is provided with appropriate stops such as $6^1$, $6^2$, $6^3$ on which rests the cylinder block P in the unit considered. The operating jack 5 actuates the pivoted receiving member through the medium of a rack which co-operates with a set of gears arranged in such manner as to initially transform the straight line movement of the jack into a movement of pre-determined rotation of the pivoted receiving member in order to orientate the block P into a position such that a movement of translation is then sufficient to place it in position in its mounting M.

To this end, a toothed segment 8 is keyed on the shaft 7 and engages with a segment 9 keyed on an intermediate shaft 10. A further toothed segment 11 is also keyed on the intermediate shaft 10, the said segment 11 being by construction of less diameter than the segment 9 and angularly displaced with respect to the segment 9. This segment 11 engages with a toothed rack 12 which is held on fixed slides 13 enabling it to move vertically, and coupled rigidly by the member 14 to the extremity 15 of the rod of the piston of the jack 5. The said member 14 has a stop $14^1$, the function of which is to limit the angular travel of the toothed segment 9, depending on the desired orientation of the block P (see FIG. 3—position P2). In a complementary manner, the shafts 7 and 10 being mounted to slide vertically in supports (not shown) and in order to permit of lifting the block P after it has been directed, the extremity of the intermediate shaft 10 is extended by a half-moon 16, the rounded face of which engages in the lower extremity of a fixed guide 17 (see FIGS. 2 and 3—from position P1 to P2), and the flat face of which can then slide vertically along this guide (see FIGS. 3 and 4—from position P2 to P3).

Referring to FIG. 1, it can be seen that the mechanical unit 2 is essentially composed of two gantries 18 and 19 which carry in particular: two parallel tubes 20 on which the conveyor trolley 21 is slidably mounted by means of sleeves 22; a threaded rod 23 mounted parallel to the tubes 20 and between these tubes, the said rod 23 serving to actuate the trolley through which it passes into a nut fixed for rotation, as will be described later; a driving mechanism for the threaded rod 23 comprising a pair of reduction gears 24 and an electric motor 25; and then a beam 26 on which are mounted contact fingers 27 and 28 intended to control the various phases of movement of the conveyor trolley 21, provided at its lower extremity with two arms 29 which enable it to grip the block P in the position P3.

Figure 5:
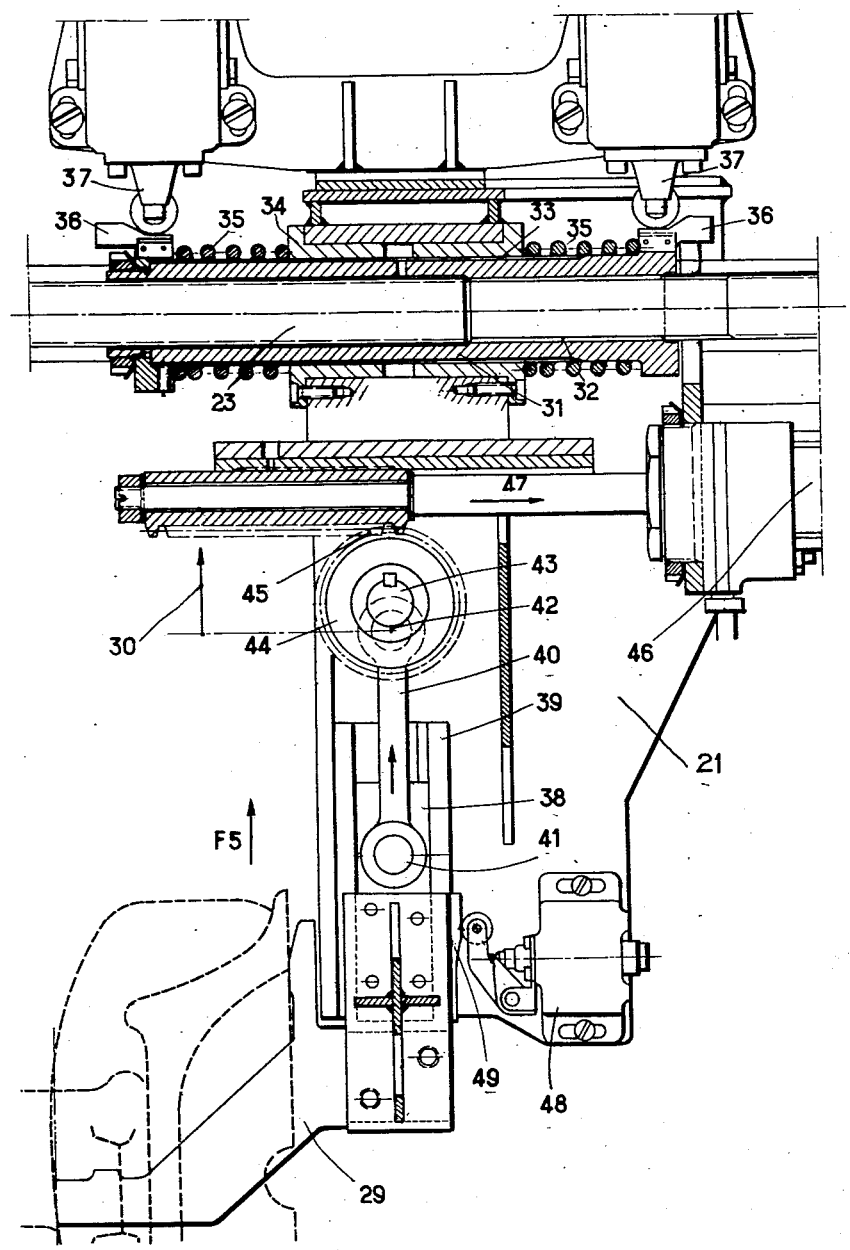
FIG. 5 is a detail view in elevation, with partial cross-section, of the mechanical conveying, lifting and lowering unit which effects the translation of the piece which has been orientated with a view to placing it in its mounting or jig.

There has been shown in FIG. 5 an enlarged view of the driving mechanism of the conveyor trolley 21 and of the lifting and lowering system 30 with which the latter is provided.

The horizontal displacement of the trolley 21 is determined by a nut 31 the threaded portion 32 of which is in permanent engagement with the threaded rod 23, the latter being mounted for rotation. The said nut 31 is held fixed for rotation for that purpose by virtue of its mounting in splines 33 through a collar 34 which is also splined and which forms part of the body of the conveyor trolley. In addition, the said splined mounting gives the nut 31 a certain liberty of movement in the axial direction and the said nut thus transmits to the trolley its displacement force by the intermediary of calibrated springs 35 which are supported on the collar 34. This relative freedom of movement of the nut 31 with respect to the body of the trolley enables an automatic stoppage of the motor 25 to be effected by the action of cams 36 belonging to the nut, and stopping contactors 37 belonging to the body of the trolley, when the trolley meets any accidental resistance during its movement, this arrangement providing a measure of safety in case of unforeseen accident during operation.

The lifting and lowering movement of the arms 29 which carry the piece 9 starting from its position P3, and the object of which has been previously indicated, is determined in the following manner.

The arms 29 are rigidly mounted on a slide 38 which can move vertically in a slide-rail 39 fixed to the body of the trolley 21. A coupling rod 40 is pivoted at one of its extremities at 41, on the slide 38, and at its other extremity at 42 along a position which is vertically eccentric with respect to the axis of rotation 43 of a gear-wheel 44, which are both carried by the trolley. The said wheel 44 engages with a toothed rack 45 rigidly fixed to the rod of a jack 46 also carried on the body of the trolley 21. The arms 29 are thus given an alternating vertical movement corresponding to the predetermined alternating travel of the moving member of the jack 46 and thus of the rack 45. The choice of a transmission by rod and crank-arm has in this case the object of imparting to the carrying arms 29 a movement the acceleration and deceleration of which are sinusoidal functions of the distance travelled.

The operation of the device is as follows:

The cylindrical block P arrives in the direction of the arrow F (see FIGS. 1 and 2) on a roller conveyor, on which it has been suitably directed about one of its vertical axes by a rotating plate or any other known device.

The blocks can thus be automatically distributed one by one on the arms 6 of the receiving member by means of another type distributor of known kind.

At this moment, the jack 5 comes into action under the effect, for example, of a contact operated by the block at the end of its travel. Its rod 15 pushes the rack 12 vertically which rotates the gears 11, 9 and 8 in the direction indicated by the arrows in FIG. 3. In this movement, the rounded face of the half-moon 18 slides on the corresponding face on the lower extremity of the fixed guide 17, thus preventing the unit from lifting. The arms 6 carrying the block P pivot upwards about their horizontal axis 7 (arrow F2, FIGS. 1 and 3) with a view to bringing and directing the said block into its position P2.

When the latter has been reached, the stop 14¹ comes into contact with the segment 9, immobilising the rack 12 and the gears 11, 9 and 8 with respect to each other. The jack 6 continues to apply its thrust and then lifts vertically the assembly of the rack, gears and supporting member of the block P, until the latter is brought into its position P3 (arrow F3, FIGS. 1 and 4).

This vertical movement is in fact permitted by the position of the half-moon 16 (see FIGS. 3 and 4), freed by rotation of the lower extremity of the fixed guide 17, and the flat face of which slides from that point along the corresponding flat face of the guide 17.

When the position P3 is reached (see FIG. 1), the motor 25 starts up, due to the action for example of a contact made at the end of the previous lifting movement, the said motor driving in rotation the threaded rod 23, which then causes a horizontal movement of the trolley 21 in the direction of the arrow F4 in the manner previously indicated.

At the level of the contact finger 27, arranged so as to come into action when the trolley has engaged its carrying arms 29 in the block in the position P3, the said finger 27 causes the motor 25 to be stopped and thus with it the trolley 21, while at the same time the jack 46 is brought into action. The latter is moved in the direction of the arrow 47 (see FIG. 5) and lifts the arms 29 of the trolley, which then lift and free the block from its position P3 in the direction of the arrow F5 (see FIGS. 1 and 5).

At the end of the movement F5, the motor 25 is again started up, for example by the action of the contactor 48, in front of which the sloping face 49, which is fixed to and moves with the slide 38, moves away. The trolley then carries the block in its travel F6 up to the level of the contact finger 28, at which level the motor is stopped as before and the jack 46, operated this time in the opposite direction to the arrow 47, causes the carrying arms 29 to lower and place the block P in its mounting M which awaits it, following the arrow F7, into the position P4.

At the end of the movement F7, the motor is started up again, for example by the action of the multiple-position contactor 48, pushed back by the sloping ramp 49 and acting in such manner that the reverse rotation of the motor 25 brings the trolley 21 back to its starting position following the travel F8, at the end of which the motor is stopped in any convenient manner. The return of the mechanical receiving and directing unit 1 to its initial position may naturally be provided by means of a suitable contactor which can come into action at the end of the return travel of the trolley 21. It is clear that the set of contactors has especially been employed for the purposes of the dynamic explanation of the mechanical operation, and that these control devices may be given various forms, depending on the usual technical practice employed in this field.

Finally, it will of course be understood that the present form of embodiment has been given by way of example only, and persons skilled in the art will naturally be able to envisage alternative forms, which will fall within the scope of the present invention.

I claim:

1. An automatic, cyclical, work-handling apparatus for machine tools for handling workpieces individually and positioning them one-by-one in a work position comprising, in combination, a cyclically operable up-ending mechanism for receiving workpieces one-by-one in a lowered position and for up-ending the workpieces and elevating them in an up-ended condition to an elevated position comprising, a pivotally mounted up-ending cradle, a single drive unit comprising a reciprocable jack operable to cyclically operate said cradle from a lowered starting position to an up-ended condition and subsequently to an elevated position in an up-ended condition and to return said cradle to the lowered starting position in readiness to receive a next successive workpiece and means for translating a portion of the travel of said jack to rotational movement of the up-ending cradle for up-ending said cradle and returning it to an initial position corresponding to a ready position for receiving a workpiece, said means for translating a portion of the travel of said jack to rotational movement of said up-ending cradle comprising a rack fixed to said jack, a first gear sector operably rotated by said jack, a second gear sector operably connected to said first gear sector and a third gear sector operably connected to the up-ending cradle and operably rotated by said second gear sector.

2. An automatic, cyclical, work-handling apparatus for machine tools for handling workpieces individually and positioning them one-by-one in a work position comprising, in combination, a cyclically operable up-ending mechanism for receiving workpieces one-by-one in a lowered position and for up-ending the workpieces and elevating them in an up-ended condition to an elevated position comprising, a pivotally mounted up-ending cradle, a pivotal shaft having said cradle fixed thereto and free to move upwardly and downwardly, a single drive unit for cyclically operating the cradle from a lowered initial starting position to a position in which the workpiece is in an up-ended condition subsequently lifting said cradle and shaft to said elevated position and operable to return said cradle and shaft to said lowered starting position in which the cradle is in readiness to receive a next successive workpiece, said drive unit comprising a reciprocable jack, a rack fixed to the jack, and a gear mechanism cooperative with the rack for rotatably driving the shaft under control of said jack to cyclically operate the cradle from said lowered starting position to an up-ended position and subsequently to said elevated position in which said cradle is in an up-ended condition and to return the cradle to said lowered starting position in readiness to receive a next successive workpiece, and said gear mechanism cooperative with said jack having means for translating a portion of the travel of said jack toward and away from said elevated position to rotational movement of said shaft for up-ending the cradle and returning it to said initial position corresponding to a ready position for receiving a workpiece.

3. An automatic, cyclical, work-handling apparatus for machine tools for handling workpieces individually and positioning them one-by-one in a work position comprising, in combination, a cyclically operable up-ending mechanism for receiving workpieces one-by-one in a lowered position and for up-ending the workpieces and elevating them in an up-ended condition to an elevated position comprising, a pivotally mounted up-ending cradle, a pivotal shaft having said cradle fixed thereto and free to move upwardly and downwardly, a single drive unit for cyclically operating the cradle from a lowered initial starting position to a position in which the workpiece is in an up-ended condition subsequently lifting said cradle and shaft to said elevated position and operable to return said cradle and shaft to said lowered starting position in which the cradle is in readiness to receive a next successive workpiece, said drive unit comprising a reciprocable jack, a rack fixed to the jack, and a gear mechanism cooperative with the rack for rotatably driving the shaft under control of said jack to cyclically operate the cradle from said lowered starting position to an up-ended position and subsequently to said elevated position in which said cradle is in an up-ended condition and to return the cradle to said lowered starting position in readiness to receive a next successive workpiece, said gear mechanism cooperative with said jack having means for translating a portion of the travel of said jack toward and away from said elevated position to rotational movement of said shaft for up-ending the cradle and returning it to said initial position corresponding to a ready position for receiving a workpiece, and means to preclude upward travel of said shaft and cradle toward said elevated position until said cradle is first up-ended.

4. An automatic, cyclical, work-handling apparatus for machine tools for handling workpieces individually and positioning them one-by-one in a work position comprising, in combination, a cyclically operable up-ending mechanism for receiving workpieces one-by-one in a lowered position and for up-ending the workpieces and elevating them in an up-ended condition to an elevated position comprising, a pivotally mounted up-ending cradle, a pivotal shaft having said cradle fixed thereto and free to move upwardly and downwardly, a single drive unit for cyclically operating the cradle from a lowered initial starting position to a position in which the workpiece is in an up-ended condition subsequently lifting said cradle and shaft to said elevated position and operable to return said cradle and shaft to said lowered starting position in which the cradle is in readiness to receive a next successive workpiece, said drive unit comprising a reciprocable jack, a rack fixed to the jack, and a gear mechanism cooperative with the rack for rotatably driving the shaft under control of said jack to cyclically operate the cradle from said lowered starting position to an up-ended position and subsequently to said elevated position in which said cradle is in an up-ended condition and to return the cradle to said lowered starting position in readiness to receive a next successive workpiece, said gear mechanism cooperative with said jack having means for translating a portion of the travel of said jack toward and away from said elevated position to rotational movement of said shaft for up-ending the cradle and returning it to said initial position corresponding to a ready position for receiving a workpiece, means to preclude upward travel of said shaft and cradle toward said elevated position until said cradle is first up-ended comprising, a stationary member, another rotatable shaft movable upwardly and downwardly cooperative with said stationary member, under rotational control of said gear mechanism into operative positions comprising a locked position in which said other shaft is held down by said stationary member and upon selected rotational movement is allowed to move upwardly by said fixed member, and said gear mechanism including means for rotating said other shaft to said locked position each time the cradle is returned to said starting position.

References Cited in the file of this patent

UNITED STATES PATENTS

| 1,003,735 | Hackney | Sept. 19, 1911 |
|---|---|---|
| 1,986,620 | Borden | Jan. 1, 1935 |
| 2,010,820 | Larson | Aug. 13, 1935 |
| 2,135,890 | Gedge | Nov. 8, 1938 |
| 2,521,216 | Hauk | Sept. 5, 1950 |
| 2,553,530 | Graves | May 15, 1951 |
| 2,567,819 | Matteson | Sept. 11, 1951 |
| 2,623,429 | Meyer | Dec. 30, 1952 |